US007767050B2

(12) United States Patent
Meier et al.

(10) Patent No.: US 7,767,050 B2
(45) Date of Patent: Aug. 3, 2010

(54) LAMINATING ROLLER ASSEMBLY, CREDENTIAL SUBSTRATE LAMINATOR AND METHOD OF LAMINATING A CREDENTIAL SUBSTRATE

(75) Inventors: James R. Meier, Saint Paul, MN (US); Greg E. Gindele, Maple Lake, MN (US); Gan Zhao, Maple Grove, MN (US); Anthony L. Lokken, Shakopee, MN (US); Chadwick M. Johnson, Savage, MN (US); Matthew K. Dunham, Eagan, MN (US)

(73) Assignee: HID Global Corporation, Irvine, CA (US)

( * ) Notice: Subject to any disclaimer, the term of this patent is extended or adjusted under 35 U.S.C. 154(b) by 699 days.

(21) Appl. No.: 11/728,589

(22) Filed: Mar. 26, 2007

(65) Prior Publication Data

US 2008/0236728 A1 Oct. 2, 2008

(51) Int. Cl.
*B44C 1/17* (2006.01)
*B32B 37/00* (2006.01)
*B32B 38/14* (2006.01)
*B32B 41/00* (2006.01)
*B32B 43/00* (2006.01)
*B30B 9/20* (2006.01)
*B30B 3/00* (2006.01)
*B29C 65/02* (2006.01)
*B29C 65/24* (2006.01)

(52) U.S. Cl. ............... 156/238; 156/249; 156/277; 156/289; 156/308.2; 156/324; 156/361; 156/555; 156/582; 156/583.1; 100/160; 100/176; 100/327; 100/334

(58) Field of Classification Search .............. 156/230, 156/238, 249, 272.2, 277, 289, 308.2, 324, 156/351, 361, 365, 378, 555, 580, 582, 583.1; 100/327, 334, 155 R, 160, 176
See application file for complete search history.

(56) References Cited

U.S. PATENT DOCUMENTS

| 3,434,902 | A | 3/1969 | Bliss | 156/230 |
| 4,287,285 | A | 9/1981 | Mosehauer | 430/124 |
| 4,300,974 | A | 11/1981 | Bauer | 156/360 |
| 4,617,080 | A | 10/1986 | Kobayashi et al. | 156/359 |
| 4,687,526 | A | 8/1987 | Wilfert | 156/64 |
| 5,060,981 | A | 10/1991 | Fossum et al. | 283/109 |
| 5,172,938 | A | 12/1992 | Schmidt | 283/109 |
| 5,238,524 | A | 8/1993 | Seki | 156/538 |

(Continued)

OTHER PUBLICATIONS

International Search Report and Written Opinion of PCT/US2008/003882 filed on Mar. 25, 2008.

*Primary Examiner*—Philip Tucker
*Assistant Examiner*—Sing P Chan
(74) *Attorney, Agent, or Firm*—Westman, Champlin & Kelly, P.A.

(57) ABSTRACT

A laminating roller assembly comprises a frame, a movable support supported by the frame, a laminating roller and a lift mechanism. The laminating roller is attached to the movable support. The lift mechanism is attached to the frame and is configured to move the movable support and the attached laminating roller relative to the frame. Additional embodiments of the invention are directed to a credential substrate laminator and a method of laminating a credential substrate using a credential substrate laminator.

17 Claims, 11 Drawing Sheets

U.S. PATENT DOCUMENTS

| | | | |
|---|---|---|---|
| 5,277,501 A | 1/1994 | Tanaka et al. | 400/120 |
| 5,437,960 A | 8/1995 | Nagate et al. | 430/256 |
| 5,484,502 A | 1/1996 | Bozanic | 156/235 |
| 5,503,702 A | 4/1996 | Filicicchia et al. | 156/249 |
| 5,614,058 A | 3/1997 | Didelot et al. | 156/542 |
| 5,626,699 A | 5/1997 | Didelot et al. | 156/99 |
| 5,673,076 A | 9/1997 | Nardone et al. | 347/171 |
| 5,735,994 A | 4/1998 | Lappe et al. | 156/386 |
| 5,807,461 A | 9/1998 | Hagstrom | 156/361 |
| 6,022,429 A | 2/2000 | Hagstrom | 156/64 |
| 6,244,319 B1 * | 6/2001 | Maynard et al. | 156/354 |
| 6,883,573 B2 | 4/2005 | Sasaki et al. | 156/351 |
| 6,981,536 B2 * | 1/2006 | Lien et al. | 156/378 |
| 2005/0134036 A1 | 6/2005 | Trimble et al. | 283/75 |
| 2006/0071420 A1 | 4/2006 | Meier et al. | 271/272 |
| 2006/0123471 A1 | 6/2006 | Fontanella et al. | 726/5 |
| 2006/0225131 A1 | 10/2006 | Klinefelter | 726/6 |
| 2007/0043684 A1 | 2/2007 | Nehowig et al. | 705/76 |

* cited by examiner

LAMINATING ROLLER ASSEMBLY, CREDENTIAL SUBSTRATE LAMINATOR AND METHOD OF LAMINATING A CREDENTIAL SUBSTRATE

FIELD OF THE INVENTION

The present invention is generally directed to a credential lamination devices and methods. More particularly, the present invention is directed to a laminating roller assembly, a credential laminator including the laminating roller assembly, and a method of laminating a credential.

BACKGROUND OF THE INVENTION

Credential production devices process credential substrates to form credentials, such as, for example, identification cards, driver's licenses, passports, and other valuable documents. The credential substrates that are used to form such credentials include, for example, paper substrates, plastic substrates, semi-rigid or rigid plastic cards, and other materials. Exemplary processes performed on the credential substrates by credential production devices to produce the credential include printing an image on the substrate, writing data to the substrate, applying an overlaminate material to the substrate and other processes.

Credential laminators are generally configured to apply an overlaminate material to one or more surfaces of credential substrates to protect the surfaces from abrasion and environmental conditions. The lamination operation performed by credential laminators utilizes a laminating roller to apply heat and pressure to the overlaminate material that overlays the surface of the substrate and bonds the overlaminate material to the surface.

One type of overlaminate material is in the form of an overlaminate patch that can be attached to a carrier to form an overlaminate ribbon. The patch includes a layer of adhesive on a protective material, such as polyester. The protective layer is attached to the carrier such that the adhesive layer is exposed for lamination to the surface of a credential substrate.

Some credential laminators must align such an overlaminate patch to the substrate prior to performing the lamination operation. Once aligned, the laminating roller can perform the lamination operation to bond the patch to the surface of the substrate.

It is desirable to have the overlaminate patch precisely conform to the surface of the credential substrate in order to provide full edge-to-edge protection to the surface. However, due to inaccuracies in the laminating process, the patch must be made slightly smaller than the surface of the substrate in order to ensure that the patch does not extend beyond the substrate's edges. Accordingly, precision during the laminating process is extremely important because it ultimately determines the size of the patch that can be laminated to the surface of the substrate and, thus, the area of the surface that can be protected.

There is a continuous demand for improved lamination accuracy in credential laminators to facilitate the lamination of overlaminate material over more surface area of credential substrates.

SUMMARY OF THE INVENTION

One embodiment of the invention is directed a laminating roller assembly that comprises a frame, a movable support supported by the frame, a laminating roller and a lift mechanism. The laminating roller is attached to the movable support. The lift mechanism is attached to the frame and is configured to move the movable support and the attached laminating roller relative to the frame.

Another embodiment of the invention is directed to a credential substrate laminator that comprises a frame, a credential substrate transport mechanism, and a first laminating roller assembly. The credential substrate transport mechanism is configured to transport a credential substrate along a processing path. The first laminating roller assembly is positioned on a first side of the processing path and includes a first movable support supported by the frame, a first laminating roller attached to the first movable support, and a first lift mechanism attached to the frame. The first lift mechanism is configured to move the first movable support and the attached first laminating roller relative to the first frame and the processing path. In one embodiment the credential laminator includes a second laminating roller assembly positioned on a second side of the processing path that is opposite the first side.

Yet another embodiment of the invention is directed to a method of laminating a credential substrate using a credential substrate laminator comprising: a frame; a laminating roller assembly including a movable support supported by the frame; a credential substrate transport mechanism; a laminating roller attached to the movable support; and a lift mechanism configured to move the laminating roller relative to the frame. In the method, the laminating roller is moved with the lift mechanism to a loading position, in which the laminating roller is displaced a loading distance from a substrate processing path. An overlaminate ribbon is loaded between the laminating roller and the substrate processing path, the ribbon comprising a plurality of overlaminate patches attached to a carrier. The laminating roller is then moved to a cue position with the lift mechanism in which the laminating roller is displaced a cue distance from the substrate processing path that is less than the loading distance. The credential substrate is transported along the processing path using the credential substrate transport mechanism and one of the overlaminate patches is aligned with the credential substrate. The laminating roller is then moved with the lift mechanism to a laminating position, in which a portion of the laminating roller is positioned in the processing path. The aligned overlaminate patch and credential substrate are then fed past the laminating roller while the laminating roller heating the overlaminate patch and press the overlaminate patch against a surface of the credential substrate.

DETAILED DESCRIPTION OF ILLUSTRATIVE EMBODIMENTS

Although the present invention has been described with reference to preferred embodiments, workers skilled in the art will recognize that changes may be made in form and detail without departing from the spirit and scope of the invention.

Embodiments of the invention will be described with reference to the drawings. Elements having the same or similar label correspond to the same or similar element.

Embodiments of the present invention include a laminating roller assembly and a credential laminator comprising the laminating roller assembly. The laminating roller assembly is used to laminate an overlaminate material to a credential substrate, such as a rigid or semi-rigid plastic identification card substrate, a paper substrate, or other substrate used to form a credential.

Figure 1:
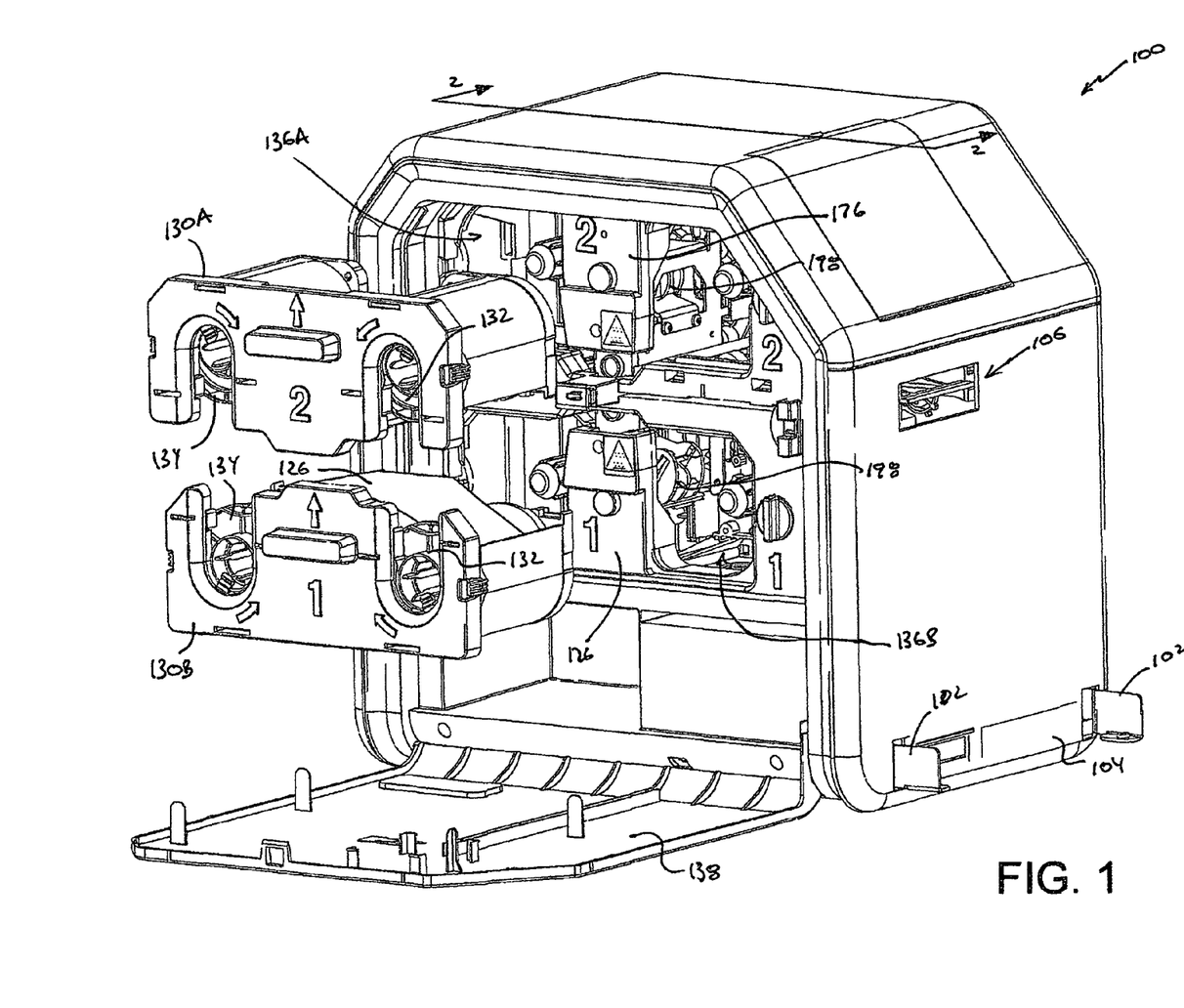
FIG. 1 is a perspective view of a credential laminator with components exploded, in accordance with embodiments of the invention.
Figure 2:
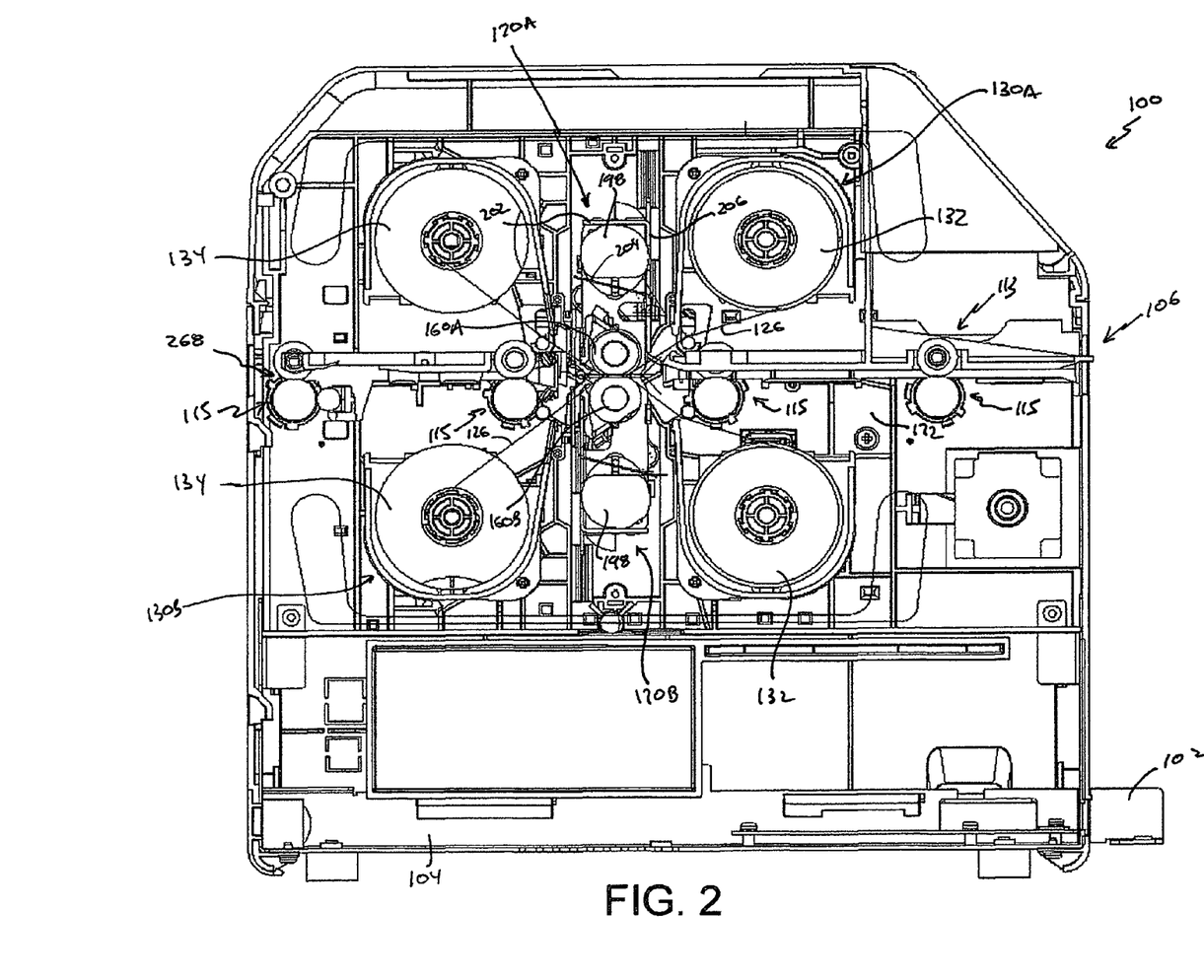
FIG. 2 is a cross-sectional view of the laminator of FIG. 1 taken generally along line 2-2.
Figure 3:
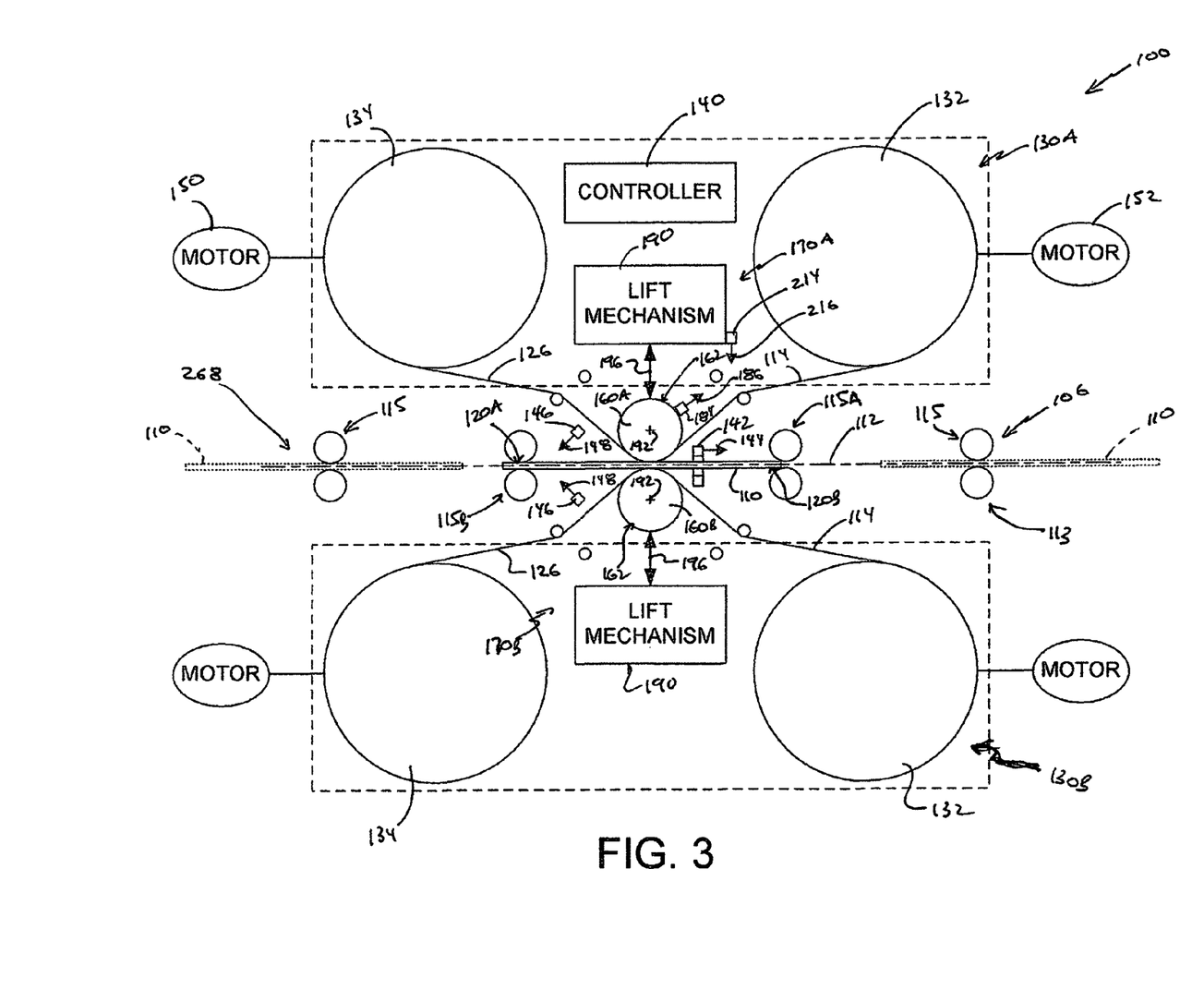
FIG. 3 is a schematic diagram of a credential laminator illustrating various embodiments of the invention.

FIG. 1 is a perspective view of a laminator 100 in accordance with embodiments of the invention with some components exploded, and FIG. 2 is a cross-sectional view of the laminator 100 of FIG. 1 taken generally along line 2-2 and FIG. 3 is a schematic diagram of the laminator 100 in accordance with embodiments of the invention. The laminator 100 can be configured as a stand-alone device, as a portion of a larger credential production device that includes printing and/or other credential processing devices (e.g., data encoder), or as a module for attachment to another credential production device, such as using tabs 102 extending from a base 104 of the laminator 100.

Additionally, although the laminator 100 will be depicted as including dual laminating rollers for dual substrate surface lamination, embodiments of the laminator also include only a single laminating roller for single substrate surface lamination operations. These and other embodiments of the invention will be described below in greater detail.

One embodiment of the laminator include a substrate input 106, at which individual credential substrates 110 are received for processing by the laminator 100. The substrates 110 can be supplied to the input from an attached supply of credential substrates, such as a cartridge or hopper containing the substrates 110. Alternatively, the substrates 110 can be supplied from another credential production device, such as a credential printing device, that is positioned in substrate handoff alignment with the laminator using, or other source of the credential substrates 110.

Received substrates 110 are fed along a processing path 112 by a substrate transport mechanism 113. One embodiment of the substrate transport mechanism 113 includes motorized pinch roller pairs 115.

In one embodiment, the processing path 112 is flat or at least free of significant bends. This is significant when the substrates 110 are rigid or semi-rigid and bending of the substrate 110 is undesired. Exemplary rigid or semi-rigid substrates 110 include plastic identification card substrates used to form identification cards.

Figure 4:
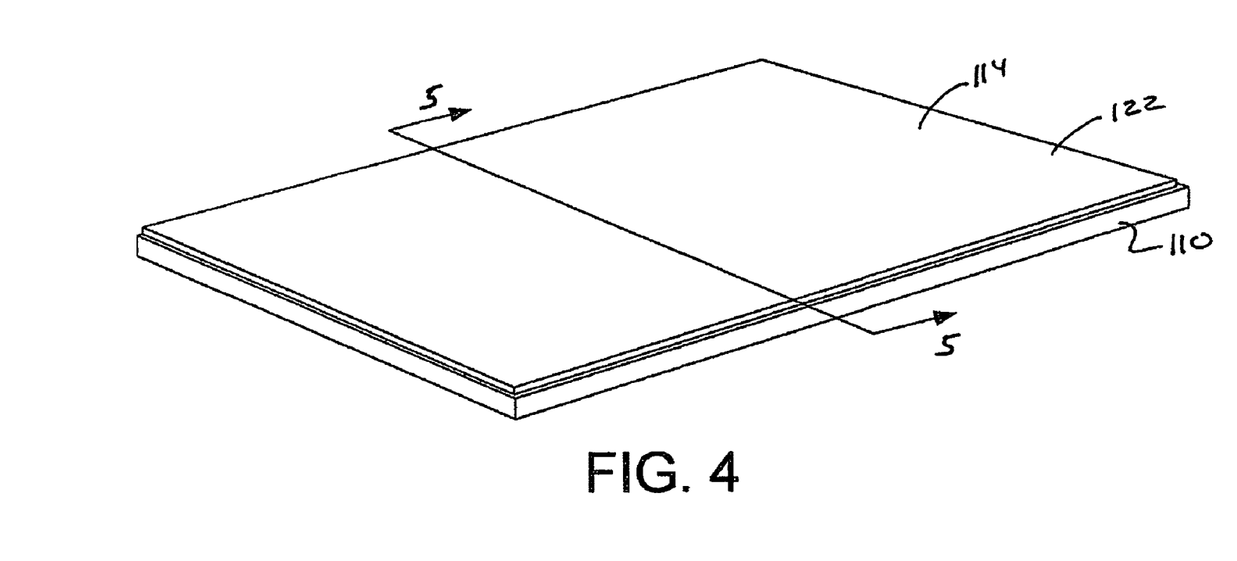
FIG. 4 is a perspective view of an exemplary credential substrate on which an exemplary overlaminate material has been laminated.
Figure 5:
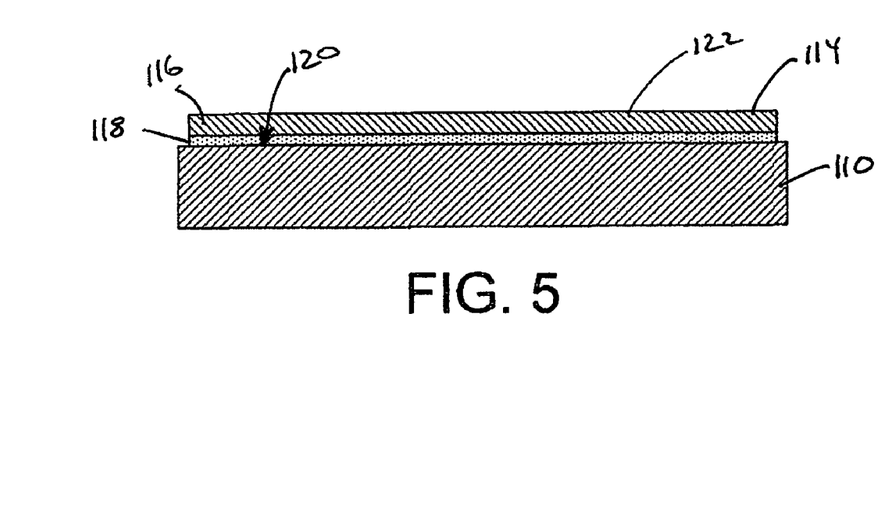
FIG. 5 is a cross-sectional view of FIG. 4 taken generally along line 5-5.

As mentioned above, the laminator 100 is configured to apply an overlaminate material 114 to at least one surface of the credential substrate 110, as illustrated in the perspective view of FIG. 4. FIG. 5 is a cross-sectional view of FIG. 4 taken generally along line 5-5.

The overlaminate material 114 includes a layer of protective material 116, such as clear polyester or other suitable material and a layer of heat activated adhesive 118 that bonds the protective material 116 to the surface 120 of the substrate 110 during a lamination process, as shown in FIG. 5.

Figure 6A:
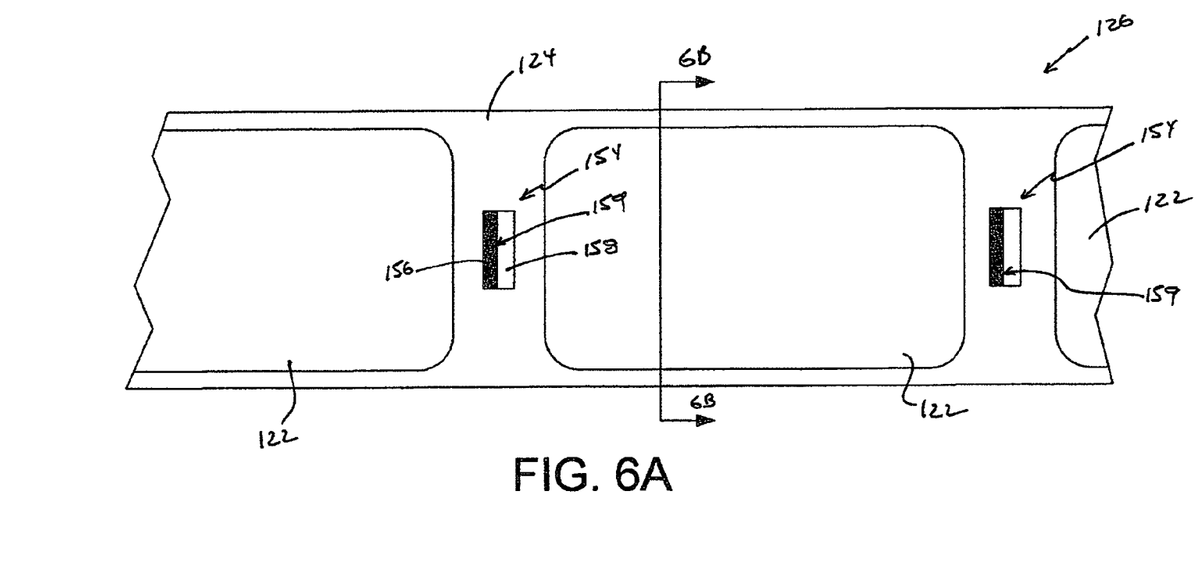
FIG. 6A is a top plan view of an overlaminate ribbon in accordance with embodiments of the invention.
Figure 6B:
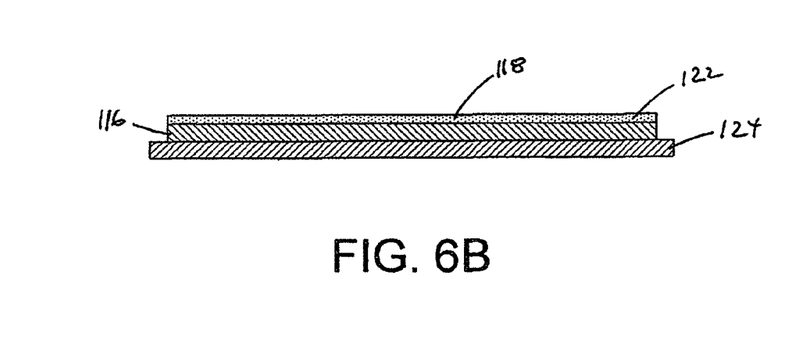
FIG. 6B is a cross-sectional view of the overlaminate ribbon of FIG. 6A taken generally along line 6B-6B.

The overlaminate material 114 can be provided in several different forms. In one embodiment, the overlaminate material 114 is in the form of individual overlaminate patches 122 that are each sized to substantially cover the surface 120 of the substrate 110, as illustrated in FIG. 4. In one embodiment, a plurality of the overlaminate patches 122 are attached to a carrier 124 to form an overlaminate ribbon 126, as shown in the top plan view of FIG. 6A. FIG. 6B is a cross-sectional view of the overlaminate ribbon of FIG. 6A taken generally along line 6B-6B. The adhesive layer 118 of each patch 122 is on the side of the protective layer 116 that is opposite the carrier 124.

Alternatively, a plurality of the overlaminate patches are joined end-to-end (not shown) to form the overlaminate ribbon 126. Each of the patches of such a ribbon can be separated along a perforated edge or cut from the remaining patches for attachment to an individual substrate 110.

In order to simplify the discussion of the invention, the overlaminate material 114 that is laminated to the surface 120 of the substrate 110 during a lamination process will be referred to as an overlaminate patch 122, which is supported on the carrier layer 124 of the ribbon 126. However, it is understood that embodiments of the invention include the substitution of the patch laminate 122 and ribbon 126 with the other embodiments of the overlaminate material 114 described above and conventional forms of overlaminate material.

In one embodiment, the laminator 100 includes one or more cartridges 130, such as cartridges 130A and 130B (FIG. 1), each of which include a supply spool 132 and a take-up spool 134, on which the ribbon 126 is wound. The cartridges 130 simplify the loading of the ribbon 126 into the laminator 100.

In one embodiment, the one or more cartridges 130 of the laminator 100 are front-load cartridges. That is, the cartridges 130A and 130B are respectively loaded into cartridge receivers 136, such as cartridge receivers 136A and 136B, that are located on a front side of the laminator 100, such as behind a cover 138, as shown in FIG. 1.

One embodiment of the laminator 100 includes a controller 140, which generally controls the operations of the laminator 100 in accordance with program instructions stored in a tangible medium of the laminator 100 or received from a host application running on a computer, for example. While the controller 140 is represented as a single entity, it is understood that the controller 140 may comprise multiple microcontrollers, microprocessors, memories, etc., and be in the form of single or multiple controller units.

Exemplary laminator operations that are directed by the controller 140 include the feeding of the overlaminate patches 122 through the control of corresponding motors, the receiving and feeding of substrates 110 along the processing path 112 through the control of the motors of the transport mechanism 113, the lamination of the patch to the substrate 110, and other laminator operations.

One embodiment of the laminator 100 includes a substrate sensor 142, illustrated schematically in FIG. 3, that is configured to detect a position of the substrate 110 along the processing path 112 and provide an output signal 144 that is indicative of whether the substrate 110 is detected. One exemplary substrate sensor 142 is an optical sensor. The output signal 144 is received by the controller 140 and is used to direct the substrate 110 through control of the transport mechanism 113 to a position where it can be aligned with a patch 122. In one embodiment, the detection of the leading (or trailing) edge of the substrate 110 by the sensor 142 indicates that the substrate 110 is in the desired position (aligned position) along the processing path 112 for alignment with a patch 122 on the ribbon 126. Alternatively, the detection of the leading (or trailing) edge of the substrate 110 is followed by the feeding of the substrate 110 a predetermined distance along the processing path 112 to place it in the desired aligned position.

One embodiment of the laminator 100 includes a patch sensor 146, illustrated schematically in FIG. 3, that is configured to detect a position of the patch 122 on the ribbon 126 and provide an output signal 148 that is indicative of whether the patch 122 or a location of the patch 122 is detected. One exemplary patch sensor 146 is an optical sensor. The output signal 148 is received by the controller 140 and is used by the controller 140 to position the patch 122 in a desired alignment (aligned position) with the substrate 110 by driving one or more motors, such as motor 150 connected to the take-up spool 134 and motor 152 connected to the supply spool 132, for example. In one embodiment, the detection of a mark 154, shown in FIG. 6A on the carrier 124 of the ribbon 126 indicates that the patch 122 is in a desired aligned position. Alternatively, the detection of the mark 154 on the carrier 124 of the ribbon 126 can be followed by the feeding of the patch 122 a predetermined distance to place it in the desired aligned position.

One embodiment of the mark 154 comprises a printed mark 156, such as a black mark on the carrier 124, and a hole 158 in the carrier 124 that cuts a portion of the printed mark 156. The hole is cut during the die cutting of the patches 122 when the overlaminate ribbon 126 is formed. Thus, the edge 159 of the printed mark 156 at the hole 158, is a known distance from the corresponding patch 122. The edge 159 is detected by the sensor 146 and indicated by the output signal 148 and is used by the controller 140 to position one of the patches 122 in the desired aligned position. The printed mark 156 to the edge 159 makes the mark 154 more "visible" to the sensor 146, particularly when the carrier 124 of the ribbon 126 is clear.

As mentioned above, embodiments of the laminator 100 include a single side and dual side laminating configurations. Accordingly, embodiments of the laminator 100 include a single laminating roller 160 for single sided lamination and dual laminating rollers 160, which accommodate single or dual sided substrate lamination.

In one embodiment, the laminator 100 includes laminating roller 160A positioned above the processing path 112, as shown in FIGS. 2-3. In another embodiment, the laminator 100 includes laminating roller 160B positioned below the processing path 112. For these single sided lamination embodiments, a platen roller or other support can be provided on the side of the processing path 112 that is opposite either laminating roller 160A or laminating roller 160B to support the substrate 110 during a single side lamination operation.

In yet another embodiment, the laminator 100 includes both laminating roller 160A and laminating roller 160B to accommodate dual sided substrate lamination. In accordance with one embodiment, the laminating rollers 160A and 160B are placed immediately above and below each other as illustrated in FIGS. 2 and 3. In this embodiment, the laminating rollers 160A and 160B provide the necessary support to the substrate 110 during single or dual sided lamination operations. That is, the pressure applied to the substrate 110 by laminating roller 160A is balanced by the pressure applied to the substrate 110 by laminating roller 160B during lamination processes. The dual laminating rollers 160 allow the laminator 100 to perform simultaneous lamination of both sides 120A and 120B (FIG. 3) of the credential substrate 110.

Alternatively, the laminating rollers 160 could be offset from each other along the processing path 112. This would require a support, such as a platen roller, for example, to be positioned on the opposing side of the processing path 112 from each laminating roller. Disadvantages to this configuration include the additional components (e.g., platen rollers), the necessity to accommodate for a longer processing path 112 resulting in a larger laminator and the potential for substrate warping problems due to the uneven heating of the substrate 110 during lamination operations.

As mentioned above, the laminator 100 can include one or two ribbon cartridges 130 each containing separate supplies of the overlaminate ribbon 126, based on whether the laminator 100 includes single or dual laminating rollers 160. Ribbon cartridge 130A supplies laminating roller 160A with overlaminate patches for laminating to the surface 120A of the substrate 110 while ribbon cartridge 130B supplies laminating roller 160B with overlaminate patches 122 for laminating to the surface 120B of the substrate 110.

In accordance with one embodiment, the laminating rollers 160A and 160B are idler rollers. That is, the laminating rollers 160A and 160B are not driven by a motor, but are free to rotate with the passage of the ribbon 126 and the substrate 110 during the lamination process in response to frictional resistance between the carrier 124 and the laminating rollers 160A and 160B. In one embodiment, the laminating rollers 160A and 160B include a rubber surface 162 that provides high friction between the corresponding carrier 124 and laminating roller 160. Accordingly, the laminating rollers 160 rotate in response to the driving of the substrate 110 by the pinch roller pairs 115A and 115B that are respectively on the upstream and downstream sides of the laminating rollers 160 and in response to the feeding of the corresponding ribbon 126 from the supply spool 132 to the take-up spool 134, for example.

In an alternative embodiment, one or both of the laminating rollers 160A and 160B are driven by a motor (not shown).

In one embodiment, each of the laminating rollers 160A and 160B is supported in a laminating roller assembly, generally referred to as 170. Embodiments of the laminating roller assembly 170 are provided in the perspective and exploded perspective views of FIGS. 7 and 8, respectively. The laminating roller assembly 170 is attached to a frame 172 of the laminator 100, that includes, for example, a rear wall 174 (FIG. 2 and partially shown in FIG. 7) and/or a front support 176 (FIG. 1). Thus, embodiments of the laminator 100 include one or two laminating roller assemblies 170 in order to provide either single or dual sided substrate lamination. Thus, one embodiment of the laminator 100 includes laminating roller assembly 170A having laminating roller 160A that is positioned above the processing path 112 and is configured to laminate a patch 122 to a top surface 120A of the substrate 110 and laminating roller assembly 170B having laminating roller 160B that is positioned below the processing path 112 and is configured to laminate a patch 122 to a bottom surface 120B of the substrate 110, as shown in FIGS. 2 and 3.

As mentioned above, in one embodiment, the laminating roller 160 is an idler roller. In one embodiment, the laminating roller 160 comprises a heating element 180 that is housed within a sleeve 182, that is supported for rotation about the heating element 180. Power is applied to the heating element 180 under the control of the controller 140 to heat the sleeve 182. The sleeve 182 transfers heat to the patch 122 and the substrate 110 during lamination operations.

Configuring the laminating roller 160 as an idler roller simplifies the laminating roller assembly 170 because it is not necessary to provide the complex gear or belt arrangement that would be necessary to provide motorized movement of the laminating roller 160 while mounting the laminating roller 160 to a movable support 183, which will be describe below. Additional complexity stems from the need to form the gear or belt arrangement from materials that would not be affected by the heat generated by the laminating roller 160. In general, plastic and metal parts would expand and contract in response to the heating and cooling of the laminating roller 160. This expansion and contraction can adversely affect the precision of the movement of the laminating roller 160, and adversely affect the precision and quality of the lamination process, which is undesirable.

For instance, it is desirable to cover the surface of the substrate 110 as completely as possible with the patch 122 in order to protect as much of the surface 120 of the substrate 110 as possible. However, due to inaccuracies in the laminating process, the patch 122 must be made slightly smaller than the surface 120 of the substrate 110 in order to ensure that the patch 122 does not extend beyond an edge of the substrate 110. Accordingly, precision during the laminating process is extremely important because it ultimately determines the size of the patch 122 that can be placed on the surface of the substrate 110.

Figure 8:
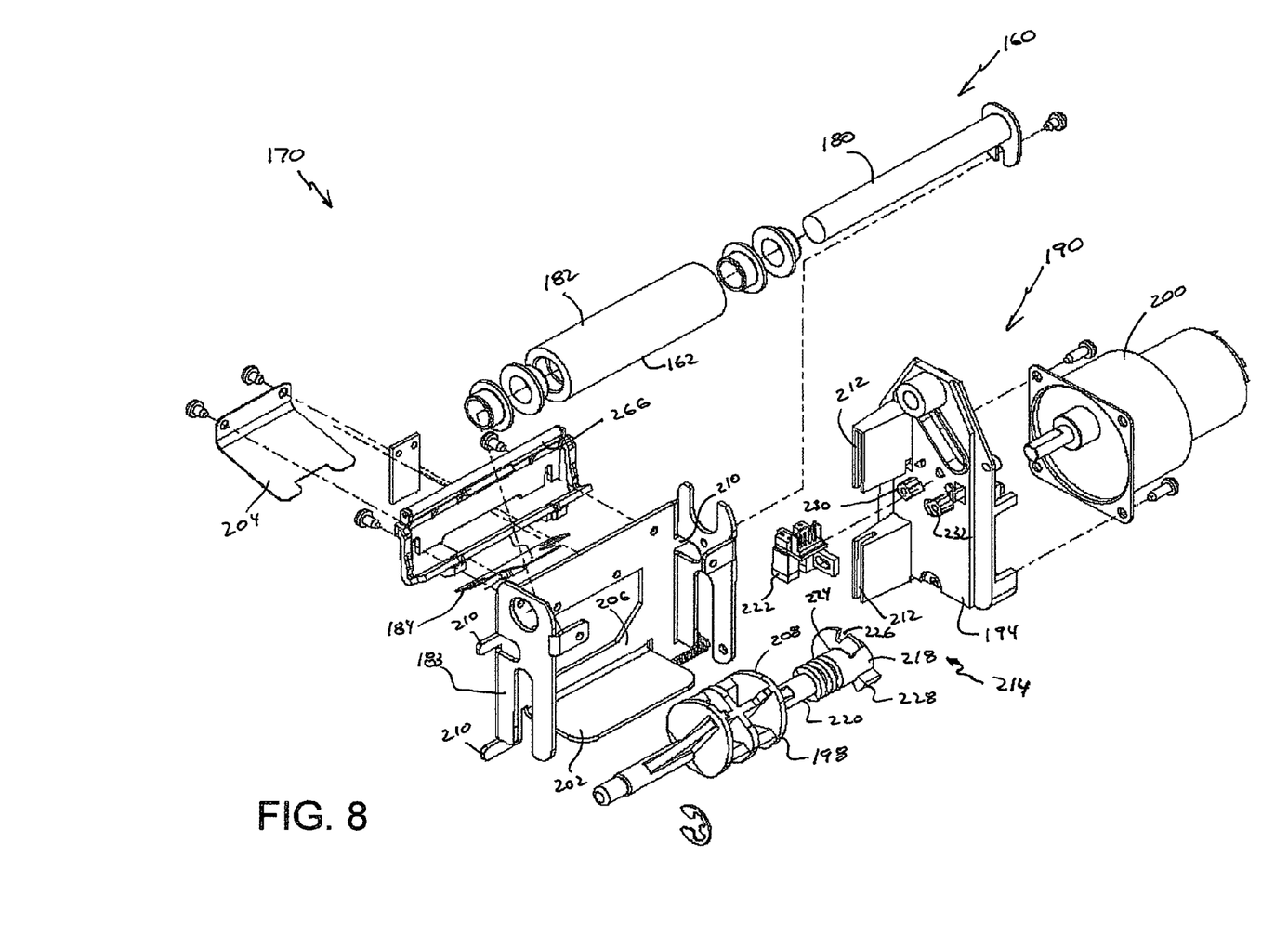

In one embodiment, the laminating roller assembly 170 includes a temperature sensor 184 that produces an output signal 186 that is indicative of a temperature of the laminating roller 160 or the sleeve 182. The output signal 186 is used by the controller 140 to control the heating of the heating element 180 and direct the sleeve 182 to the desired temperature. In one embodiment, the temperature sensor 184 is attached to the support 183 for direct contact with the laminating roller 160, as illustrated in FIG. 8.

One embodiment of the laminating roller assembly 170 includes a motorized lift mechanism 190, shown schematically in FIG. 3, which is configured to move the laminating roller relative to the processing path 112 and the frame 172 of the laminator 100 in response to control signals from the controller 140. This movement of the laminating roller 160 refers to movement of the axis of rotation 192 of the laminating roller 160 relative to the frame 172 and the processing path 112 rather than the rotational movement of the laminating roller 160 about its axis of rotation 192.

Figure 7:
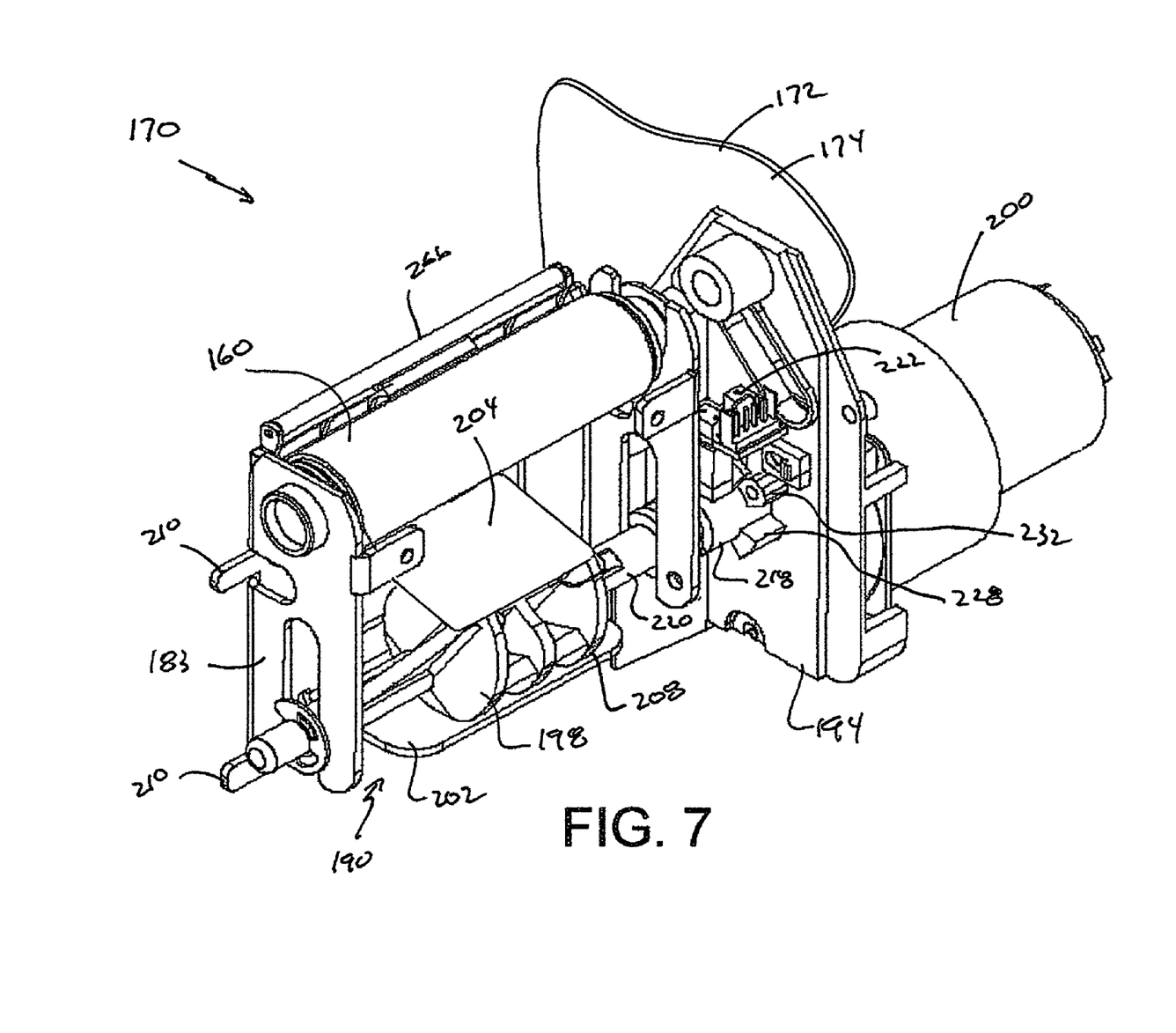
FIGS. 7 and 8 are perspective and exploded perspective views of a laminating roller assembly in accordance with embodiments of the invention.

In one embodiment, the laminating roller assembly 170 comprises a frame 194, the movable support 183, and the lift mechanism 190. The frame 194 is attached to the frame 172, such as rear wall 174, of the laminator 100, as shown in FIG. 7. In one embodiment, the frame 194 of the laminating roller assembly 170 does not move relative to the frame 172 of the laminator 100. The laminating roller 160 is attached to the movable support 183, which is configured for movement relative to the frames 172 and 194.

In one embodiment, the lift mechanism 190 moves the laminating roller 160 in a substantially vertical plane that is approximately perpendicular to the processing path 112, as represented by the arrow 196 in FIG. 3. In one embodiment, the lift mechanism 190 comprises a cam member 198 supported by the frame 194 for rotation relative to the movable support 183. A motor 200 is coupled to the cam member 198 and drives rotation of the cam member 198. The cam member 198 is pinned between a tab member 202, tab member 204 and a wall 206 of the moveable support 183. The cam member 198 includes a cam surface 208 that engages the tab members 202 and 204. Rotation of the cam member 198 by the motor 200, under the control of the controller 140, causes the cam surface 208 to drive the movable support 183 either away from or toward the processing path 112 due to its engagement with the tab members 202 and 204.

In one embodiment, the movable support 183 includes one or more side tab members 210 extending from each side of the support 183. The side tab members 210 are received by slots 212 mounted to the frame 194. The side tab members 210 slide within the slots 212 to guide the movement of the movable support 183 in the desired vertical plane. However, it is understood that other methods and configurations can be employed to provide the desired movement of the movable support 183 relative to the frame 194 or frame 172.

In accordance with additional embodiment, the laminating roller assembly 170 and its lift mechanism 190 are configured to provide non-vertical lateral movement or pivotal movement of the laminating roller 160 relative to the frame 172 of the laminator 100.

In another embodiment, the lift mechanism 190 is configured to move the laminating roller 160 to a plurality of predefined positions relative to the substrate processing path 112. In one embodiment, the laminating roller assembly 170 includes a position sensor 214 (FIG. 3) having an output signal 216 that is indicative of a position of the movable support 183 or the laminating roller 160 relative to the processing path 112. The controller 140 uses the output signal 216 from the sensor 214 to direct the laminating roller 160 to a desired position.

In one embodiment, the position sensor 214 comprises a position indicator 218 mounted to a shaft 220 of the cam member 198 and an optical sensor 222, as shown in FIG. 8. The position indicator 218 includes a flange 224 that extends between the emitter and receiver of the sensor 222. The flange 224 includes one or more openings, such as opening 226, that are indicative of a particular angular position of the cam member 198 and, thus, the position of the movable support 183 and the laminating roller 160. In one embodiment, the position indicator 218 includes one or more stops, such as stop 228, that are mounted to the shaft 220 of the cam member 198 that are configured to engage corresponding maximum and minimum stops 230 and 232 on the frame 194. The engagement of the stop 228 with one stops 230 or 232 on the frame 194 limits the angular movement of the cam member 198 and generally provides two predetermined positions for the laminating roller 160 (e.g., fully raised and fully lowered). Additional predetermined positions are set based on the locations of the openings 226 in the flange 224 of the position indicator 218.

Embodiments of the predefined positions of the laminating roller 160 will be described with reference to the schematic diagrams of FIGS. 9A-C. While the discussion only references laminating roller 160A, embodiments of the laminating roller assembly 170B containing laminating roller 160B include the same predefined positions.

Figure 9A:
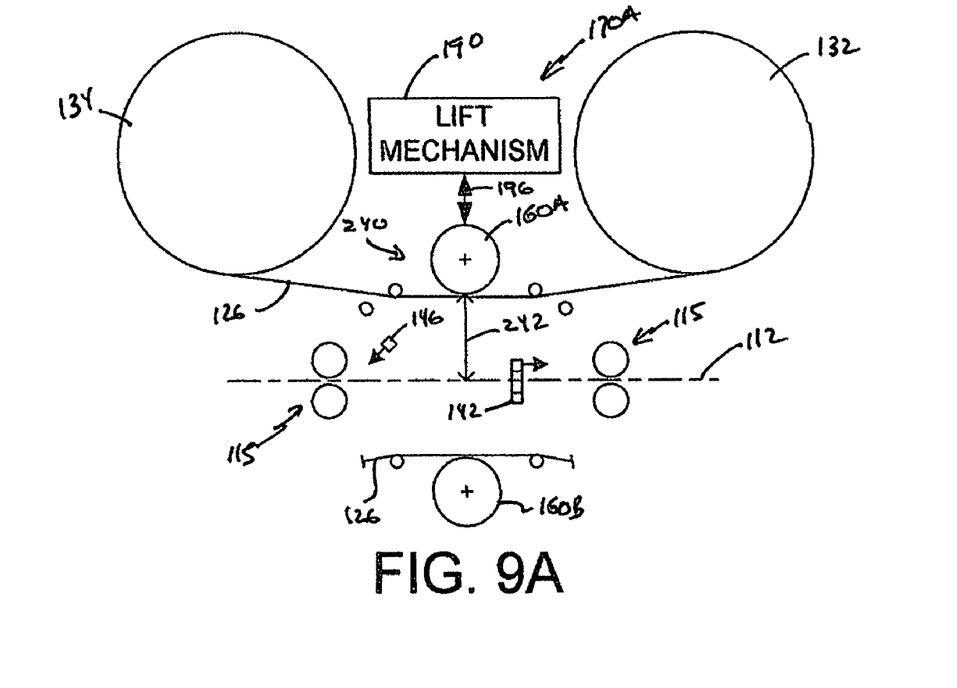
FIGS. 9A-D are schematic diagrams illustrating various predefined positions of single and dual laminating rollers, in accordance with embodiments of the invention.

One embodiment of the predefined positions includes a loading position 240, in which the laminating roller 160A is displaced a loading distance 242 from the substrate processing path 112, as illustrated in the schematic diagram of FIG. 9A. The loading gap or distance 242 between the laminating roller 160A and the substrate processing path 112 allows for the easy insertion and removal of the overlaminate ribbon 126 between the laminating roller 160A and the processing path 112. Exemplary embodiments of the loading distance 242 include distances in the range of greater than 0.600 inch.

Figure 9B:
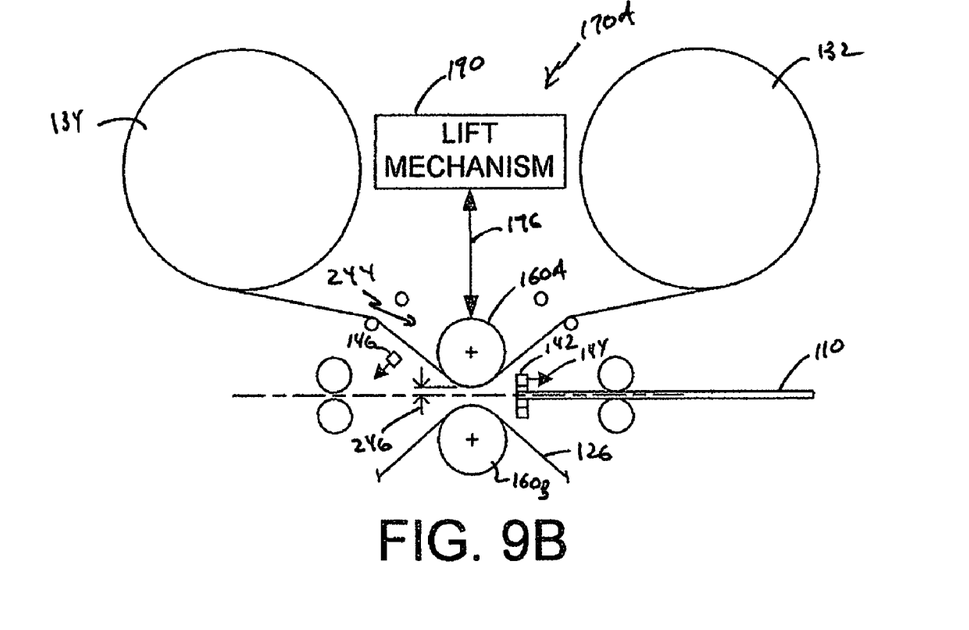

Another embodiment of the predefined positions includes a cue position 244, in which the laminating roller 160A is displaced a cue distance 246 from the substrate processing path 112, as illustrated in the schematic diagram of FIG. 9B. The cue distance 246 between the laminating roller 160A and the substrate processing path 112 is preferably small and is less than that of the loading distance 242. In one embodiment, the cue distance 246 is selected such that it is in close proximity to the processing path 112, but sufficiently displaced from the processing path 112 to allow for the positioning of the patch 122 and the substrate 110 relative to each other and the laminating roller 160A prior to a lamination operation. Exemplary embodiments of the cue distance 246 include distances in the range of less than 0.080 inch and greater than 0.010 inch. After the positioning and alignment of the patch 122 and the substrate 110 is completed, the laminating roller 160A moves toward the processing path 112 and into a laminating position 248, shown in FIG. 9C. One purpose for placing the laminating roller in the cue position 244 is to prevent or minimize undesired relative movement between the patch 122 and the substrate 110 or the laminating roller 160A as the laminating roller 160A moves from the cue position 244 to the laminating position 248 and, thus, improve the precision of the laminating operation.

Another embodiment of the predefined positions includes the laminating position 248 mentioned above, which is illustrated schematically in FIGS. 9C and 9D. When the laminating roller 160A is in the laminating position 248, a portion of the laminating roller 160A is positioned in the processing path 112, the thickness of which is defined by the thickness of the substrate 110 and the one or two patches 122. Thus, "in the processing path 112" as used herein means that the laminating roller 160A will engage and apply a pressure to the patch 122 and the substrate 110 during a lamination operation.

The laminating roller 160A is moved to the laminating position 248 after the substrate 110 and the patch 122 have been aligned to each other while the laminating roller 160A is in the cue position 244. Movement of the laminating roller 160A to the laminating position 248 causes the laminating roller 160A to press the patch 122 against the substrate 110 at the desired pressure for the lamination process.

Figure 9C:
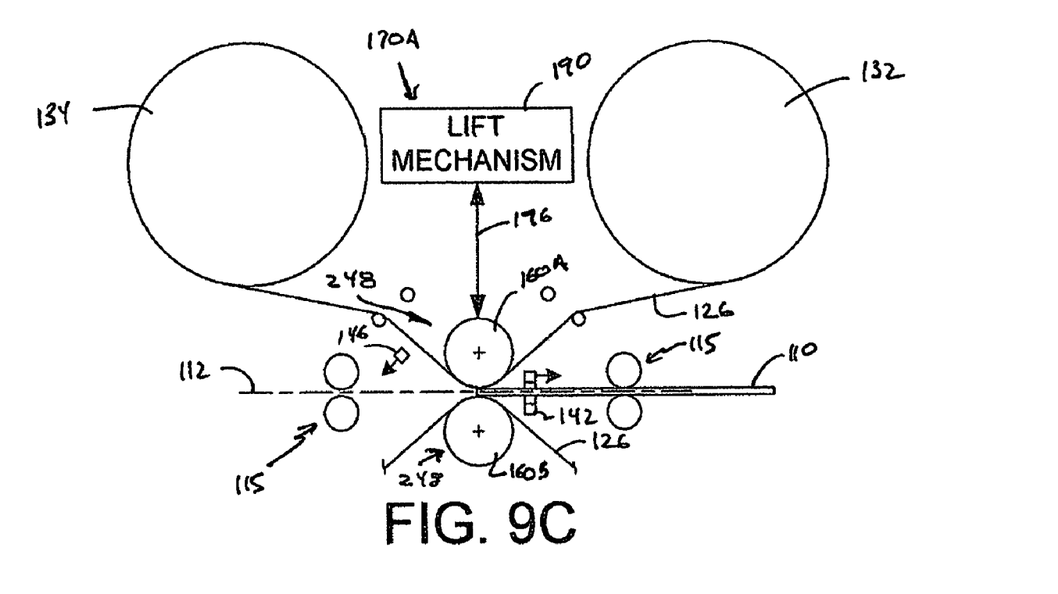
Figure 9D:
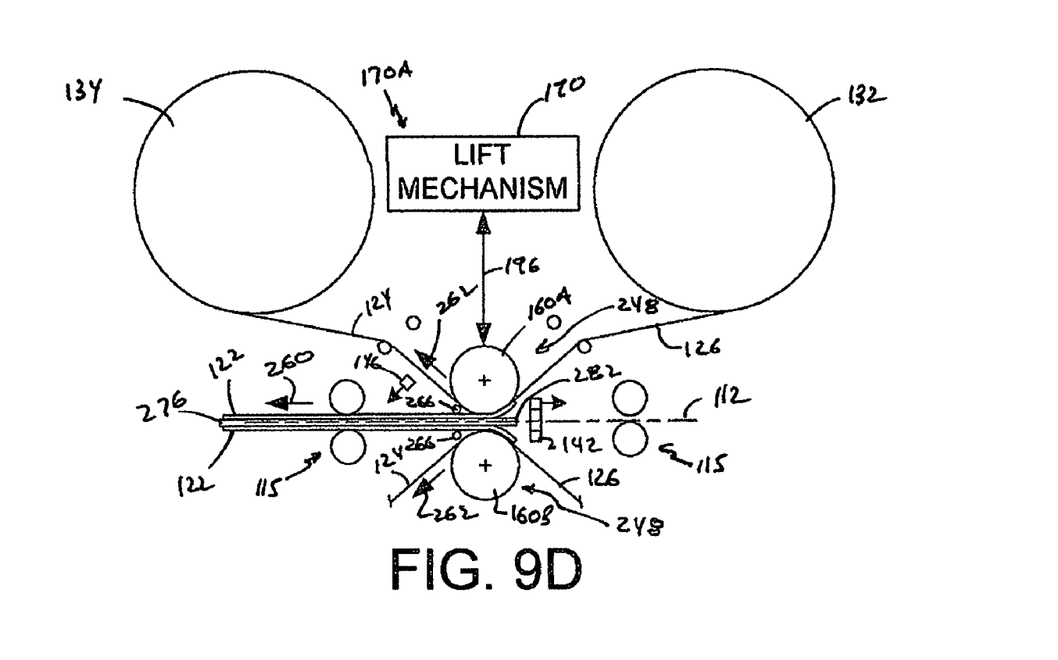
Figure 10:
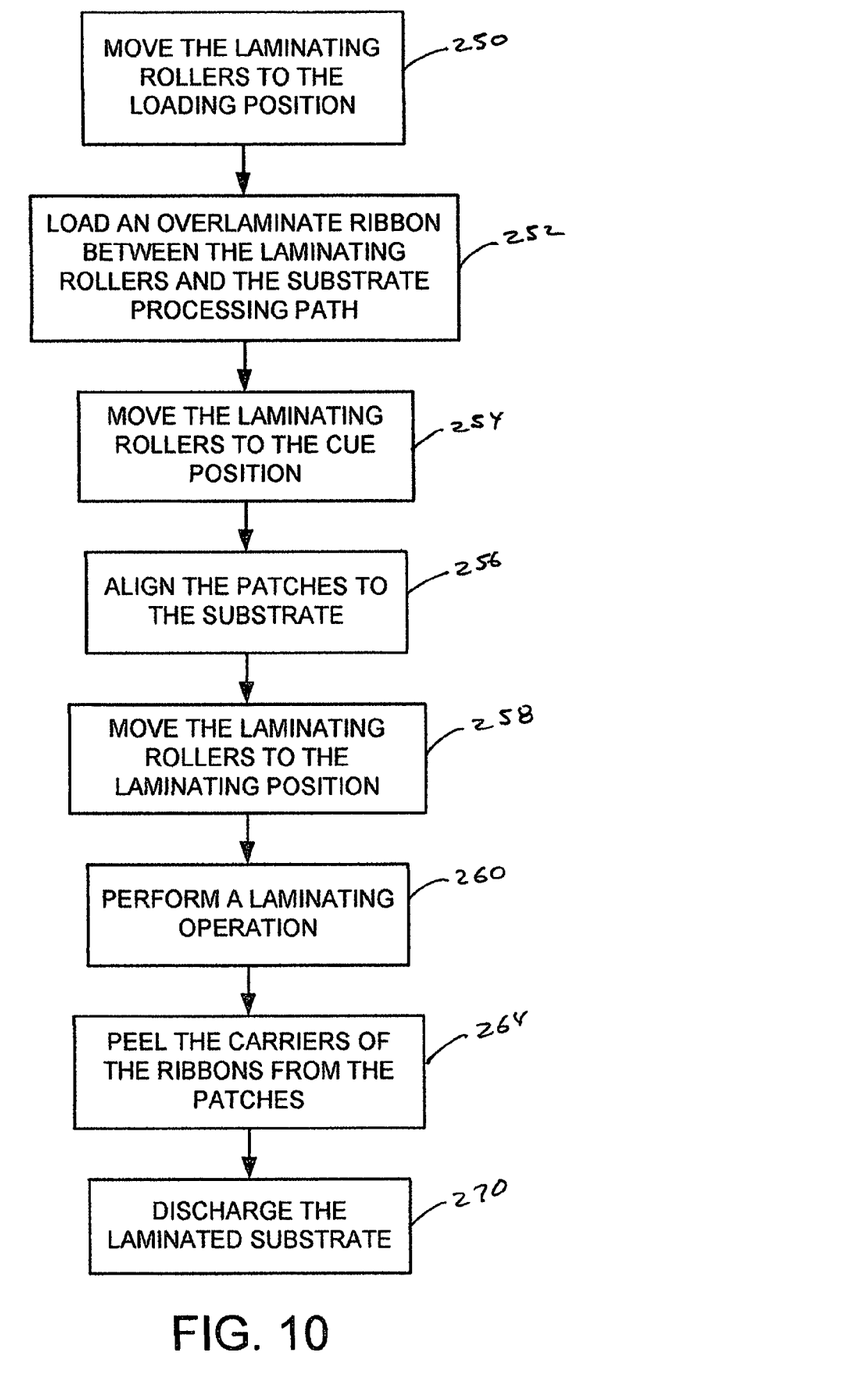
FIG. 10 is a flowchart illustrating a method of laminating two sides of a substrate, in accordance with embodiments of the invention.

FIG. 10 is a flowchart illustrating embodiments of a general lamination operation of overlaminate patches 122 to front and back surfaces 120A and 120B of the substrate 110 using a pair of the laminating roller assemblies 170 described above. Reference will also be made to FIGS. 9A-D, which depict only a portion of the laminating roller assembly 170B in order to simplify the illustrations. It is understood that steps of the method described below can be eliminated, reordered and modified while remaining within the spirit of the present invention. Additionally, the steps of the method are generally performed by the controller 140 in response to instructions stored in a tangible medium of the laminator 100 or received from a host application running on a computer, for example.

At step 250, the laminating rollers 160A and 160B are moved to the loading position 240, shown in FIG. 9A, and the overlaminate ribbons 126 are installed between the laminating rollers 160A and 160B and the processing path of the laminator 100, at step 252. The overlaminate ribbons 126 can be provided in cartridges, such as the front load cartridges 130A and 130B shown in FIG. 1. As the cartridges 130A and 130B are loaded into the corresponding cartridge receivers 136A and 136B of the laminator 100, the ribbons 126 are positioned between the laminating rollers 160A and 160B and the processing path 112, as shown in FIG. 9A. The laminating rollers 160A and 160B are then moved to the cue position 244 (FIG. 9B) at step 254.

A substrate 110 is received at the substrate input 106 from a source of the substrates 110 and is transported along the processing path 112 toward the laminating rollers 160A and 160B, as shown in FIG. 3. The source of substrates 110 can be, for example, a supply of the credential substrates 110, another credential production device that is positioned in substrate handoff alignment with the laminator 100, or other source of the credential substrates 110.

The controller 140 aligns the patches 122 on the ribbons 126 and the substrate 110 with each other at step 256 by moving them to their aligned positions, as described above. Detection of the leading edge of the substrate 110 using the substrate sensor 142 is illustrated in FIG. 9B.

Once the patches 122 and the substrate 110 have been aligned with each other, the laminating rollers 160A and 160B are moved, at step 258, to the laminating position 248, shown in FIG. 9C. A laminating operation then commences, at step 260, in which the substrate 110 and the patches 122 are fed along the processing path 112 in the direction respectively indicated by arrows 260 and 262 of FIG. 9D, while the heated laminating rollers 160A and 160B compress the patches 122 against the substrate 110 while heating the patches 122 to activate the adhesive layers 118 (FIG. 5) of the patches 122 and bond the patches 122 to the surfaces 120A and 120B of the substrate 110. In one embodiment, the laminating rollers 160A and 160B are idler rollers that rotate in response to the direction that the ribbon and substrate 110 are fed.

At step 264, the carriers 124 of the ribbons 126 are peeled from the patches 122 leaving the patches 122 bonded to the substrate 110 as shown in FIG. 9D. This peeling of the carriers 124 is facilitated by the angling of the carrier 124 away from the processing path 112 and, possibly, the addition of a low-adhesion coating between the carriers 124 and their patches 122. Peel-off rollers 266, shown in FIG. 9D, can be positioned downstream of the laminating rollers 160A and 160B to ensure a full release of the patches 122 from the carriers 124. In one embodiment, the laminating roller assembly 170 includes the peel-off roller 266, which is attached to the movable support 183, as shown in FIG. 8.

The final laminated substrate 110, such as that shown in FIG. 4, can then be discharged by the pinch rollers 115 of the transport mechanism 113, shown in FIG. 3, through an output 268 where it can be, for example, collected in a hopper, or transferred to another credential production device for further processing, as indicated at step 270 of the method.

One embodiment of the laminating step 260 is one that can be used to perform a "hot" or "cold" lamination operation. The "hot" lamination operation is where the laminating rollers 160A and 160B are heated, such as by the heating element 180 shown in FIG. 8. In a "cold" lamination, the adhesive layer 118 of the patch 122 is not formed of a heat-activated adhesive. Instead, the adhesive layer 118 will bond to the substrate 110 without the application of heat. This embodiment of the laminating step 260 will be described with reference to FIGS. 11A and B.

Figure 11A:
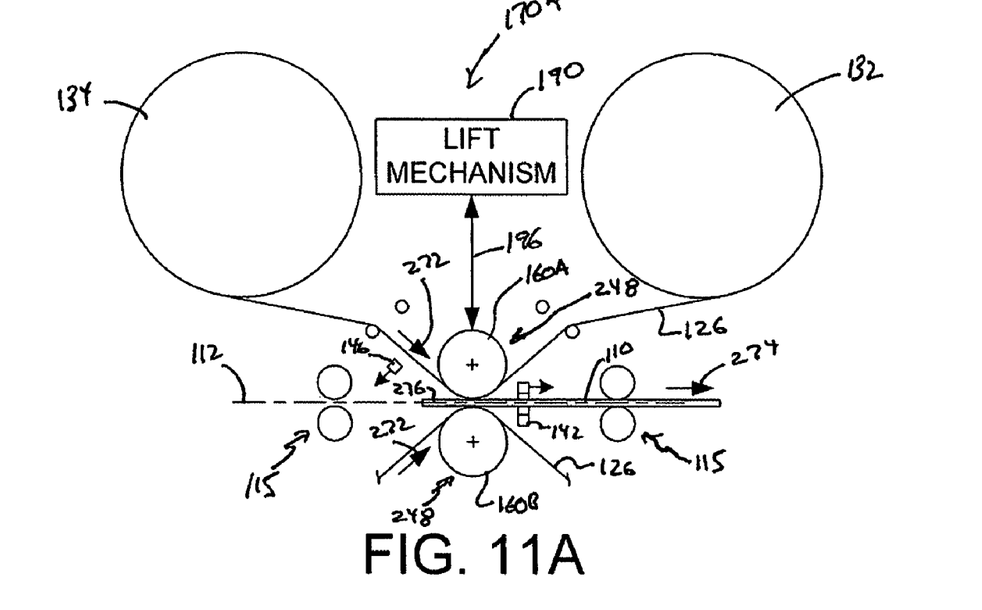
FIGS. 11A-B illustrate laminating steps in accordance with embodiments of the invention.
Figure 11B:
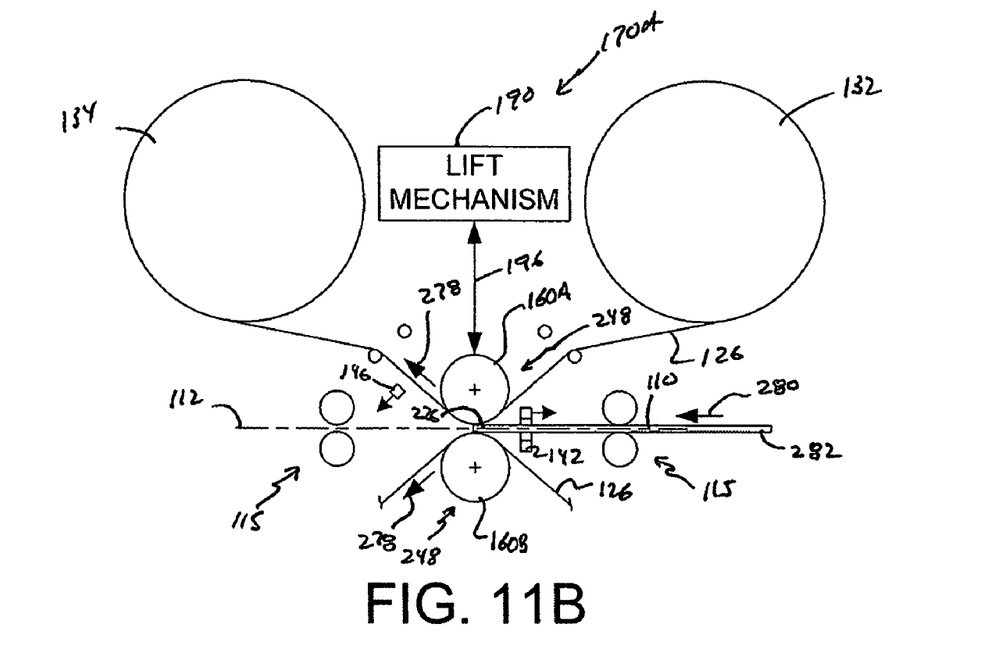

In one embodiment, the laminating rollers 160A and 160B move from the cue position 244 to the laminating position 248 after the substrate 110 and patches 122 on the ribbons 126 have been aligned and after the leading edges of the aligned substrate 110 and patches 122 are fed past the laminating rollers 160A and 160B, as illustrated in FIG. 11A. Accordingly, the laminating rollers 160A and 160B compress the patches against the substrate 110 beginning at a location that is between the leading and trailing edges of the substrate 110. This allows the patches 122 on the ribbon 126 to be positioned closer to each other on the carrier 124.

Following the movement of the laminating rollers 160A and 160B to their laminating positions 248, the laminating operation commences in which the laminating rollers 160A and 160B roll over the entire surface of the patches 122 and substrate 110. In one embodiment, the aligned substrate 110 and the patches 122 are initially moved in the direction respectively indicated by arrows 272 and 274, shown in FIG. 11A, until the laminating rollers 160A and 160B roll over the leading edge 276 of the substrate 110, as shown in FIG. 11B. This operation bonds the leading portion of the patches 122 to the leading portion of the substrate 110. Next, the ribbons 126 including the patches 122 and the substrate 110 are moved in the direction respectively indicated by arrows 278 and 280 (FIG. 11B) to cause the laminating rollers 160A and 160B to roll over the entire length of the substrate 110 and through the trailing edge 282 of the substrate 110 and complete the lamination operation, as illustrated in FIG. 9D.

Although the methods described above described the simultaneous lamination of both surfaces 120A and 120B of the substrate 110, embodiments of the method also include the performance of a patch lamination to a single surface 120 of the substrate 110 using only one of the laminating roller assemblies 170. The substrate 110 can be supported at the active laminating roller assembly 170 by the laminating roller 160 of the inactive laminating roller assembly 170, or by a platen roller. Additionally, only a single patch 122 must be fed and aligned to the substrate 110 in the step 256 and only a single carrier 124 must be peeled from the laminated patch in step 264, for example.

What is claimed is:

1. A laminating roller assembly of a credential production device comprising:
   a frame;
   a movable support supported by the frame;
   a laminating roller attached to the support; and
   a lift mechanism comprising:
      a cam member attached to the frame and having a cam surface that engages the support; and
      a motor configured to drive rotation of the cam member;
   wherein the cam member comprises three predetermined angular positions, each of which direct the support and the attached laminating roller to a different position relative to the frame.

2. The assembly of claim 1, wherein the lift mechanism further comprises:
   a position indicator attached to the cam member; and
   a sensor configured to detect one of the predetermined angular positions of the cam member using the position indicator.

3. The assembly of claim 1, wherein the laminating roller is non-motorized and comprises a heating element.

4. A credential substrate laminator comprising:
   a frame;
   a credential substrate transport mechanism configured to transport a credential substrate along a processing path; and
   a first laminating roller assembly positioned on a first side of the processing path, the first laminating roller assembly comprising:
      a first movable support supported by the frame;
      a first laminating roller attached to the first movable support; and
      a first lift mechanism attached to the frame and configured to move the first movable support and the attached first laminating roller relative to the first frame and the processing path, the first lift mechanism comprising:
         a cam member attached to the frame and having a cam surface that engages the support; and
         a motor configured to drive rotation of the cam member;
      wherein the cam member comprises three predetermined angular positions, each of which direct the support and the attached first laminating roller to a different position relative to the frame.

5. The laminator of claim 4, wherein the first lift mechanism further comprises:
   a position indicator attached to the cam member; and
   a sensor configured to detect one of the predetermined angular positions of the cam member using the position indicator.

6. The laminator of claim 4, wherein the first laminating roller is non-motorized and comprises a heating element.

7. The laminator of claim 4, further comprising a second laminating roller assembly positioned on a second side of the processing path that is opposite the first side, the second laminating roller assembly comprising:
   a second movable support supported by the frame;
   a second laminating roller attached to the second movable support; and
   a second lift mechanism attached to the frame and configured to move the second movable support and the attached second laminating roller relative to the second frame, the processing path and the first laminating roller.

8. The laminator of claim 7, wherein the first and second laminating rollers are non-motorized and each comprise a heating element.

9. The laminator of claim 7, further comprising:
   a first overlaminate ribbon between the first laminating roller and the processing path; and
   a second overlaminate ribbon between the first laminating roller and the processing path.

10. The laminator of claim 9, wherein the first and second overlaminate ribbons each comprise a plurality of overlaminate patches supported on a carrier.

11. The laminator of claim 7, wherein:
   the first lift mechanism comprises:
      a cam member attached to the frame and having a cam surface that engages the support; and
      a motor configured to drive rotation of the cam member; and
   the second lift mechanism comprises:
      a cam member attached to the frame and having a cam surface that engages the support; and
      a motor configured to drive rotation of the cam member.

12. The laminator of claim 11, wherein:
   the cam member of the first lift mechanism comprises three predetermined angular positions, each of which direct the first movable support and the attached first laminating roller to a different position relative to the frame; and
   the cam member of the second lift mechanism comprises three predetermined angular positions, each of which direct the second movable support and the attached second laminating roller to a different position relative to the frame.

13. The laminator of claim 12, wherein each of the first and second lift mechanisms further comprises:
   a position indicator attached to the cam member; and
   a sensor configured to detect one of the predetermined angular positions of the cam member using the position indicator.

14. The laminator of claim 7, wherein the first and second laminating rollers are aligned with a plane that is substantially perpendicular to the processing path.

15. A method of laminating a credential substrate using a credential substrate laminator comprising: a frame; a credential substrate transport mechanism; a laminating roller assembly including a movable support supported by the frame; a laminating roller attached to the movable support; and a lift mechanism configured to move the laminating roller relative to the frame, the method comprising:
- moving the laminating roller with the lift mechanism to a loading position, in which the laminating roller is displaced a loading distance from a substrate processing path;
- loading an overlaminate ribbon between the laminating roller and the substrate processing path, the ribbon comprising a plurality of overlaminate patches attached to a carrier;
- moving the laminating roller to a cue position with the lift mechanism in which the laminating roller is displaced a cue distance from the substrate processing path that is less than the loading distance;
- transporting a credential substrate along the processing path using the credential substrate transport mechanism;
- aligning one of the overlaminate patches with the credential substrate;
- moving the laminating roller with the lift mechanism to a laminating position, in which a portion of the laminating roller is positioned in the processing path;
- feeding the aligned overlaminate patch and credential substrate past the laminating roller; and
- heating the overlaminate patch and pressing the overlaminate patch against a surface of the credential substrate using the laminating roller during the feeding step.

16. The method of claim 15, wherein aligning an overlaminate patch with the credential substrate comprises sensing a leading edge of the substrate and sensing a mark on the carrier.

17. The method of claim 15, wherein:
the laminating roller is non-motorized; and
the method further comprises rotating the laminating roller in response to frictional resistance between the carrier and the laminating roller.

* * * * *